United States Patent
Willett, Jr. et al.

(10) Patent No.: US 10,066,485 B2
(45) Date of Patent: Sep. 4, 2018

(54) TURBOMACHINE BLADE COVER PLATE HAVING RADIAL COOLING GROOVE

(71) Applicant: General Electric Company, Schenectady, NY (US)

(72) Inventors: Fred Thomas Willett, Jr., Burnt Hills, NY (US); Eric David Roush, Greer, SC (US)

(73) Assignee: General Electric Company, Schenectady, NY (US)

( * ) Notice: Subject to any disclaimer, the term of this patent is extended or adjusted under 35 U.S.C. 154(b) by 298 days.

(21) Appl. No.: 14/959,442

(22) Filed: Dec. 4, 2015

(65) Prior Publication Data
US 2017/0159440 A1    Jun. 8, 2017

(51) Int. Cl.
*F01D 5/08* (2006.01)
*F01D 5/14* (2006.01)
(Continued)

(52) U.S. Cl.
CPC ............. *F01D 5/082* (2013.01); *F01D 5/081* (2013.01); *F01D 5/147* (2013.01); *F01D 5/24* (2013.01); *F01D 5/3015* (2013.01); *F01D 11/003* (2013.01); *F01D 11/006* (2013.01); *F05D 2220/32* (2013.01); *F05D 2240/12* (2013.01); *F05D 2240/30* (2013.01); *F05D 2240/55* (2013.01); *F05D 2240/81* (2013.01); *F05D 2260/20* (2013.01); *Y02T 50/676* (2013.01)

(58) Field of Classification Search
None
See application file for complete search history.

(56) References Cited

U.S. PATENT DOCUMENTS

| 5,018,943 A | 5/1991 | Corsmeier et al. |
| 8,393,869 B2 * | 3/2013 | Kim .................. F01D 5/22 416/219 R |

(Continued)

FOREIGN PATENT DOCUMENTS

| EP | 0 801 208 A2 | 10/1997 |
| EP | 2 243 927 A2 | 10/2010 |

(Continued)

OTHER PUBLICATIONS

Extended European Search Report and Opinion issued in connection with corresponding EP Application No. 16200716.5 dated May 15, 2017.

*Primary Examiner* — Igor Kershteyn
*Assistant Examiner* — Theodore Ribadeneyra
(74) *Attorney, Agent, or Firm* — Ernest G. Cusick; Hoffman Warnick LLC

(57) ABSTRACT

A turbomachine blade may include an airfoil and a shank coupled to the airfoil. The shank may include a cover plate having a first circumferential face and a second, opposing circumferential face. A radial cooling groove is positioned in the first circumferential face and is configured to allow a cooling fluid to pass from a first radial position to a second, different radial position relative to the platform. The radial cooling groove provides cover plate and shank cooling. In addition, the radial cooling groove may deliver fluid for purging gaps between blade platforms and cover plates, which prevents the ingestion of hot gas from the turbine flowpath.

17 Claims, 10 Drawing Sheets

(51) Int. Cl.
    *F01D 11/00*     (2006.01)
    *F01D 5/24*     (2006.01)
    *F01D 5/30*     (2006.01)

(56) References Cited

U.S. PATENT DOCUMENTS

| | | | |
|---|---|---|---|
| 8,529,124 | B2 | 9/2013 | Kaul |
| 8,529,194 | B2 | 9/2013 | Ammann et al. |
| 2008/0008593 | A1 | 1/2008 | Zagar et al. |
| 2008/0181767 | A1* | 7/2008 | Brillert .................. F01D 5/081 415/170.1 |
| 2012/0093649 | A1* | 4/2012 | Halfmann ............. F01D 5/3015 416/95 |
| 2012/0114480 | A1* | 5/2012 | Amaral .................. F01D 5/081 416/1 |
| 2012/0121423 | A1* | 5/2012 | Honkomp ............. F01D 11/006 416/190 |
| 2014/0030100 | A1* | 1/2014 | Joshi .................... F01D 5/3007 416/219 R |
| 2015/0086361 | A1* | 3/2015 | Ahmad ................. F01D 5/3015 416/1 |
| 2015/0125301 | A1* | 5/2015 | Headland ............... F01D 5/082 416/174 |

FOREIGN PATENT DOCUMENTS

| | | |
|---|---|---|
| EP | 2 500 525 A1 | 9/2012 |
| FR | 2 324 873 A1 | 4/1977 |
| FR | 2 645 902 A1 | 10/1990 |
| GB | 2 435 909 A | 9/2007 |

\* cited by examiner

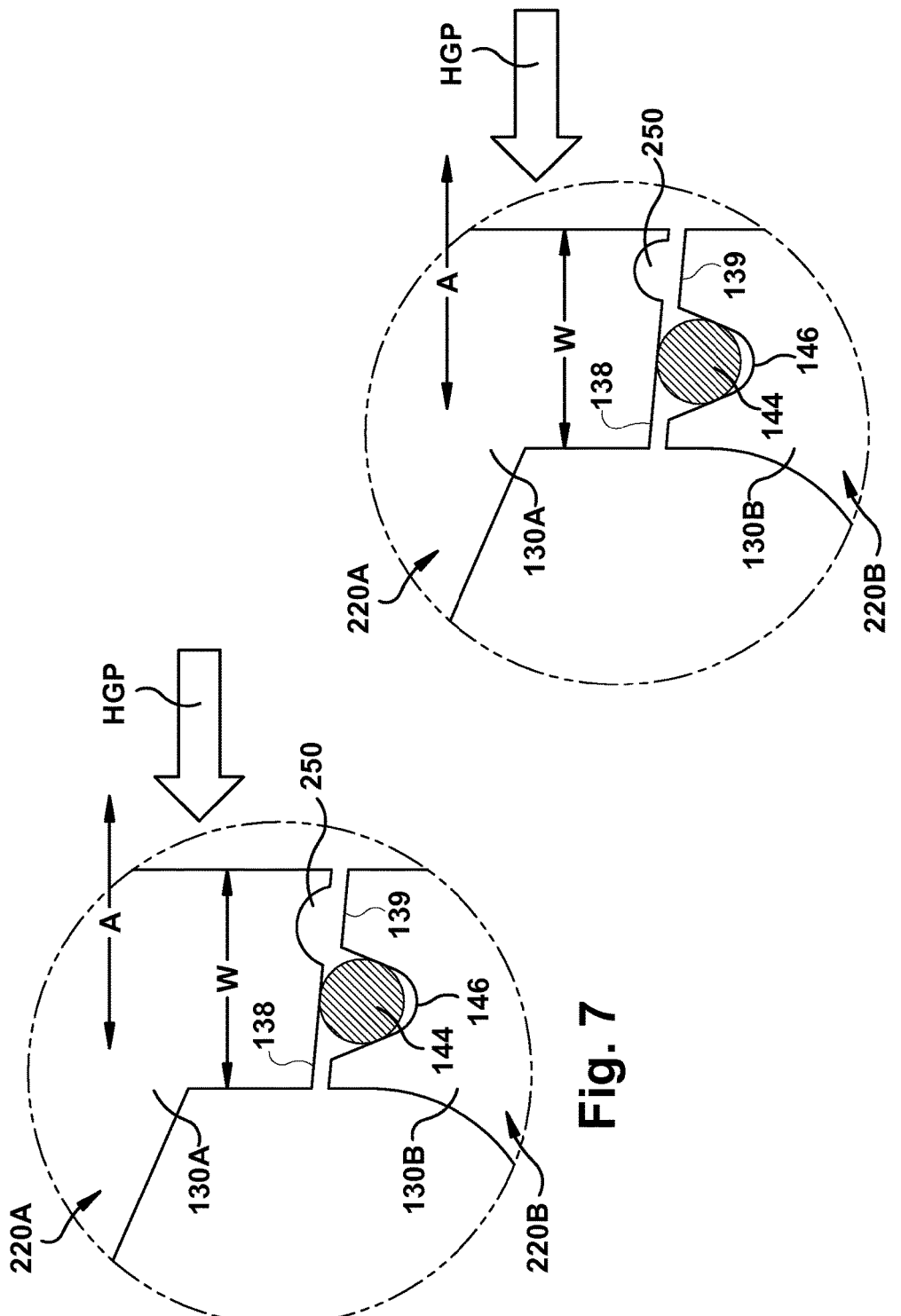

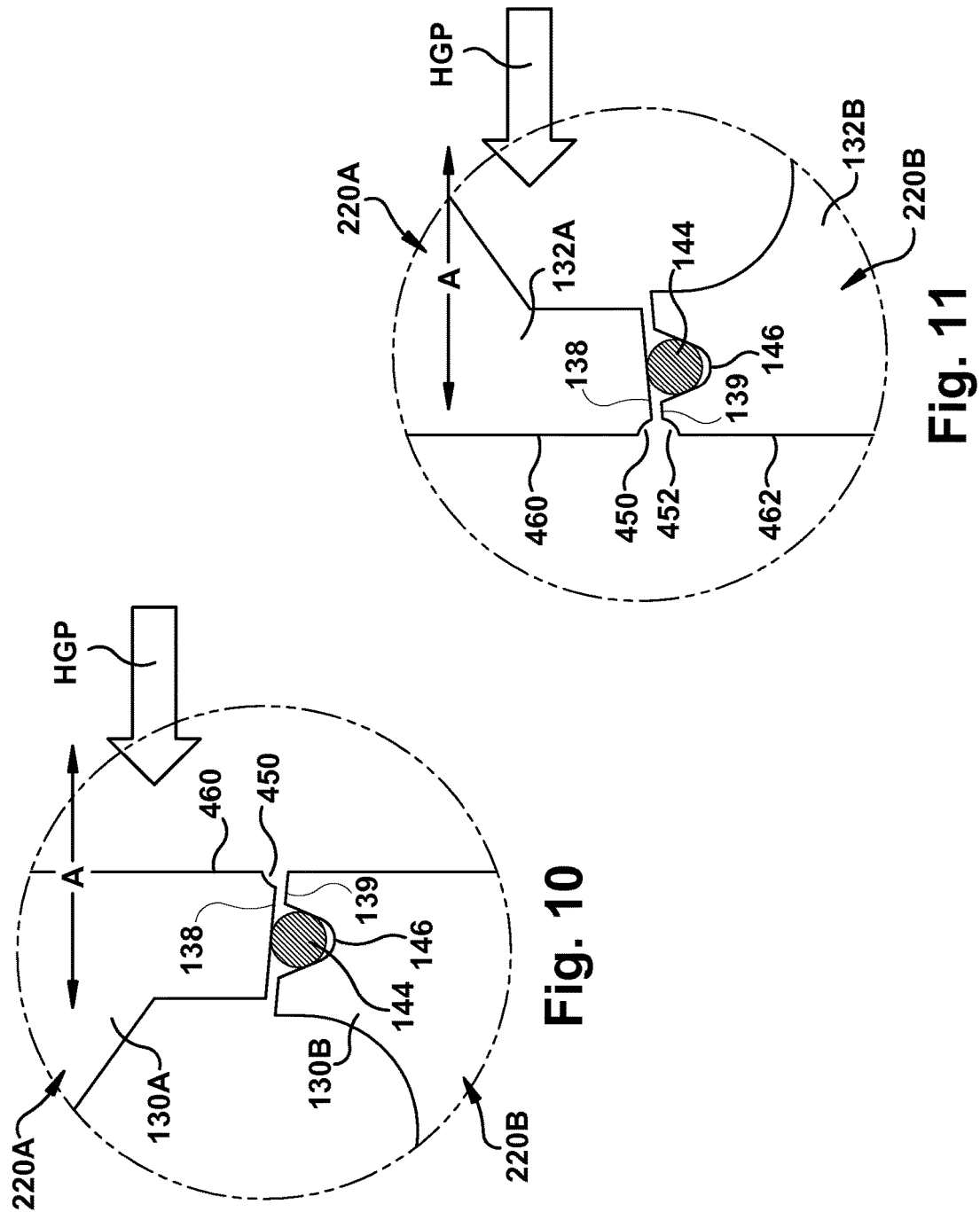

TURBOMACHINE BLADE COVER PLATE HAVING RADIAL COOLING GROOVE

BACKGROUND OF THE INVENTION

The disclosure relates generally to turbomachine blade cooling, and more particularly, to a turbomachine blade having a cover plate including a radial cooling groove.

Modern turbomachine blades, such as those used in gas turbomachines, require extensive cooling. Deemed secondary to airfoil cooling, and often overlooked, is the region outside of the hot gas path, i.e., the shank and cover plates. The blade platform forms the inner surface of the hot gas path and isolates the shank and cover plates from the high temperature gas stream. The cover plates form one edge of the wheelspace boundary, through which cooler air is passed to purge the wheelspace and inhibit ingestion of hot gas from the hot gas path into the shank region.

A typical industrial turbomachine blade design includes a platform seal pin and radial seal pins to retard the ingestion of hot gas into the shank region. A typical radial seal pin is cylindrical and is designed to fit in a groove in the cover plate of the blade. To avoid binding under load, the blades are designed such that there is a small gap between adjacent blades. Under rotation, the pin extends and contacts the adjacent blade, forming a line of contact. Despite the use of radial seal pins, it is common to have leakage across the platform seal pin or through the gap between radial and platform seal pins. That is, the seal arrangement is not perfect and leakage paths exist through which some hot gas will penetrate into the shank region. One means of preventing ingestion of hot gases into the wheelspace is to pressurize the shank, i.e., to ensure that the pressure in the shank cavity is sufficient to inhibit leakage. While this arrangement is effective, this method increases the amount of required (e.g., compressor) flow dedicated to turbine cooling and reduces overall turbomachine efficiency. Because the capability of the turbomachine blade material decreases as metal temperature increases and because thermal gradients change the stress field in the turbomachine blade, control of shank and cover plate metal temperatures is desirable. The narrow radial passage through which purge air flows adjacent the radial seal pins provides negligible cooling to the shank and cover plate.

BRIEF DESCRIPTION OF THE INVENTION

A first aspect of the disclosure provides a turbomachine blade, comprising: an airfoil; a shank coupled to the airfoil, the shank including a cover plate having a first circumferential face and a second, opposing circumferential face; and a radial cooling groove positioned in the first circumferential face, the radial cooling groove configured to allow a cooling fluid to pass from a first radial position to a second, different radial position relative to the platform.

A second aspect of the disclosure provides a turbomachine blade, comprising: an airfoil; a platform coupled to the airfoil; a shank extending from the platform, the shank including a cover plate having a first circumferential face and a second, opposing circumferential face; a radial seal pin seat positioned within the first circumferential face of the cover plate and configured to receive a radial seal pin therein to seal a circumferential gap between adjacent turbomachine blade cover plates; and a radial cooling groove positioned within the second, opposing circumferential face of the cover plate, the radial cooling groove configured to allow a cooling fluid to pass therethrough.

A turbomachine, comprising: a plurality of blades, each blade including: an airfoil and a shank coupled to the airfoil, the shank including a cover plate having a first circumferential face and a second, opposing circumferential face; and a radial cooling groove positioned in the first circumferential face, the radial cooling groove configured to allow a cooling fluid to pass from a first radial position to a second, different radial position relative to the platform.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIGS. 7-11 show partial, enlarged cross-sectional views of adjacent turbomachine blades employing various embodiments of a radial cooling groove according to embodiments of the disclosure.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides a turbomachine blade including a cover plate having a radial cooling groove to improve cooling of the cover plate, shank and platform regions of the blade.

Figure 1:
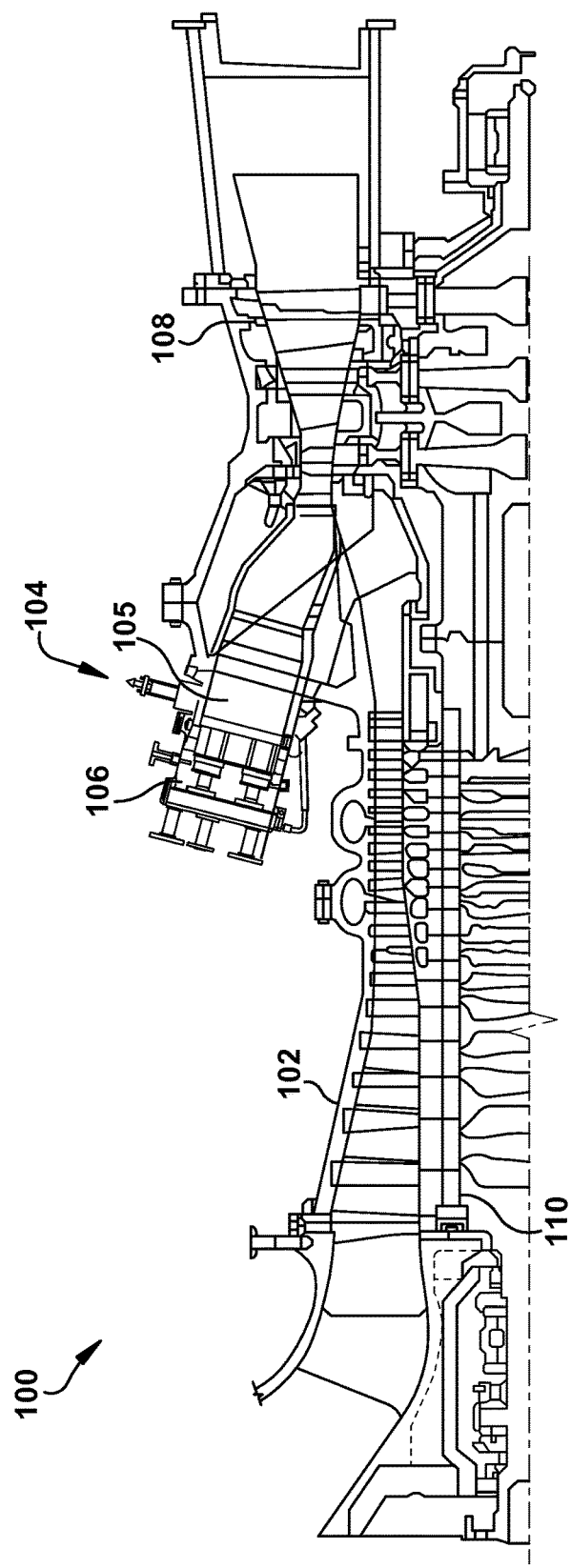
FIG. 1 is a schematic illustration of an exemplary combustion turbine engine.

FIG. 1 is a schematic illustration of an illustrative turbomachine in the form of a gas turbine system 100. System 100 includes a compressor 102 and a combustor 104. Combustor 104 includes a combustion region 105 and a fuel nozzle assembly 106. System 100 also includes a turbine 108 and a common compressor/turbine shaft 110 (sometimes referred to as rotor 110). In one embodiment, system 100 is a MS7001FB engine, sometimes referred to as a 9FB engine, commercially available from General Electric Company, Greenville, S.C. Embodiments of the disclosure are not limited to any one particular gas turbine engine, and may be implanted in connection with other engines including, for example, the MS7001FA (7FA) and MS9001FA (9FA) engine models of General Electric Company. Further, teachings of the disclosure are not limited to gas turbines, and may be applied to any variety of turbomachine such as steam turbines, jet engines, compressors, etc. As used herein, the terms "axial", "radial" and "circumferential" are used with rotor 110 as the reference structure.

In operation, air flows through compressor 102 and compressed air is supplied to combustor 104. Specifically, the compressed air is supplied to fuel nozzle assembly 106 that is integral to combustor 104. Assembly 106 is in flow communication with combustion region 105. Fuel nozzle assembly 106 is also in flow communication with a fuel source (not shown in FIG. 1) and channels fuel and air to combustion region 105. Combustor 104 ignites and combusts fuel. Combustor 104 is in flow communication with turbine 108 for which gas stream thermal energy is converted to mechanical rotational energy. Turbine 108 is rotatably coupled to and drives rotor 110. Compressor 102 also is rotatably coupled to shaft 110. In the illustrative embodiment, there is a plurality of combustors 104 and fuel nozzle assemblies 106.

Figure 2:
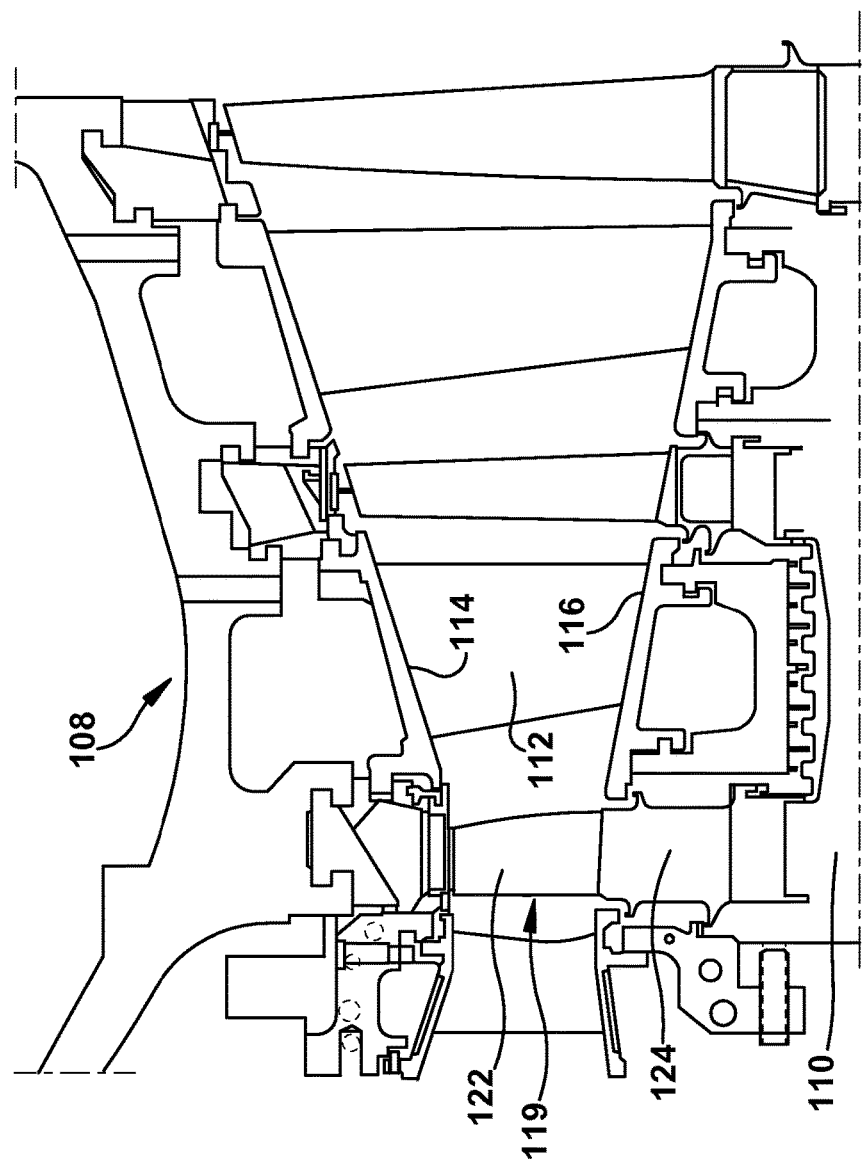
FIG. 2 is a cross-section illustration of an exemplary gas turbine assembly with a three stage turbine that may be used with the combustion turbine engine in FIG. 1.

FIG. 2 is a cross-section illustration of an illustrative turbine assembly 108 with a three stage turbine that may be used with gas turbine system 100 in FIG. 1. Turbine assembly 108 includes a vane sub-assembly 112. Vane sub-assembly 112 is held in the turbine assembly 108 by a radially outer platform 114 and a radially inner platform 116. Turbine assembly 108 also includes a rotating blade 119, which may include an airfoil 122 held to rotor 110 by a shank 124. The teachings of the disclosure are typically applied to a rotating blade 119, but may be applied to vane sub-assembly 112 and rotating blade 119, which shall be referred to collectively as a "turbomachine blade".

Figure 3:
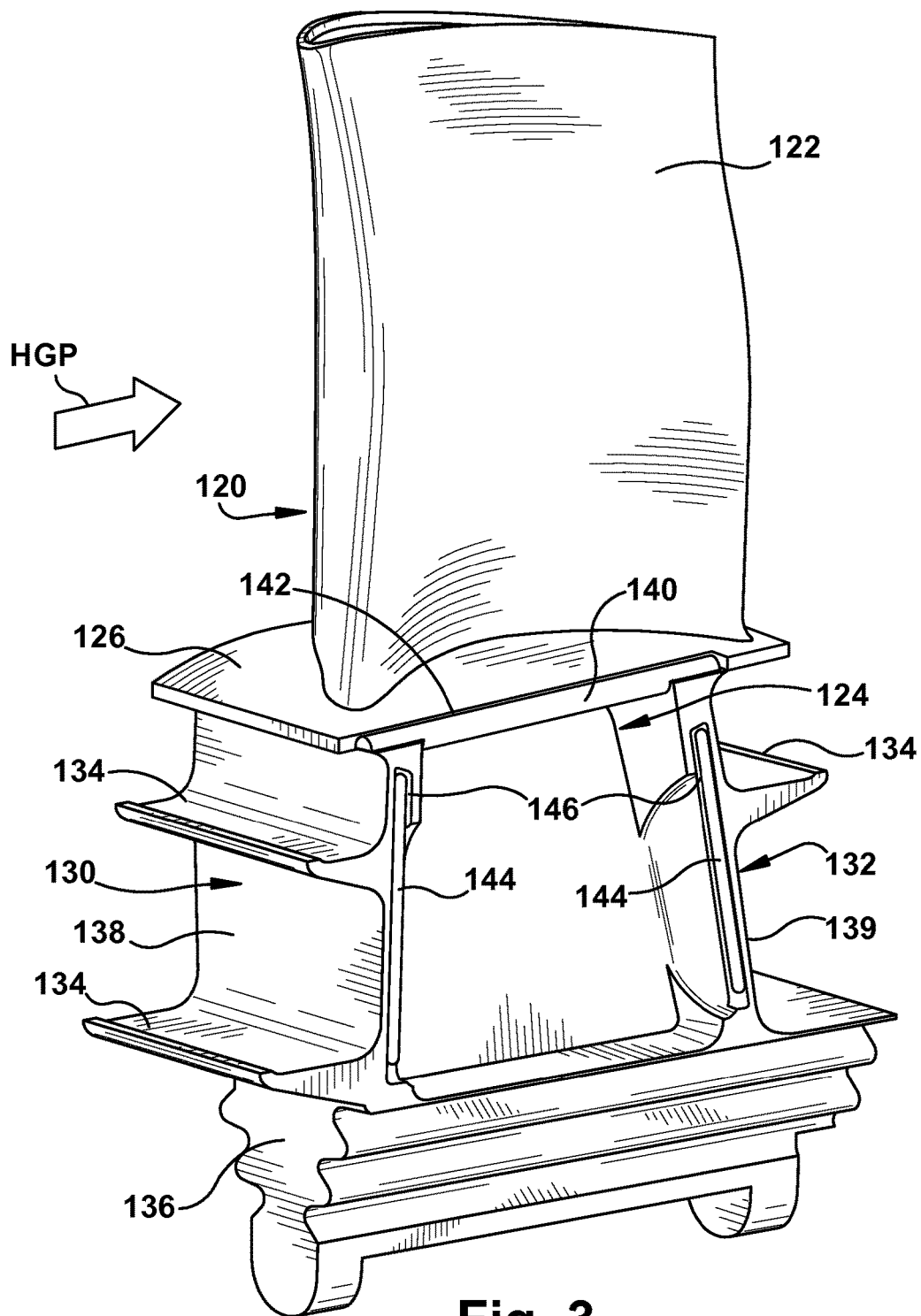
FIG. 3 shows an enlarged perspective view of an illustrative conventional turbomachine blade.

FIG. 3 is a perspective view of an illustrative turbomachine blade 120 (illustrated here as a rotating blade). Turbomachine blade 120 may include airfoil 122 and shank 124. Shank 124 is coupled to airfoil 122 by a platform 126. Shank 124 includes a pair of opposing cover plates 130, 132. Arrow HGP shows the direction of flow in the hot gas path. As indicated by HGP direction, cover plate 130 is an upstream side cover plate, facing towards HGP, and cover plate 132 is a downstream side cover plate, facing away from HGP. One or more angel wings 134 may extend from each cover plate 130, 132. Various forms of connection to either rotor 110 (FIGS. 1-2) or a casing of a turbomachine may be applied depending on how turbomachine blade 120 is employed. In FIG. 3 where the blade is a rotating blade, a connection tree 136 may be provided to couple turbomachine blade 120 to a rotor wheel (not shown). Each turbomachine blade may include a first circumferential face 138 and a second, opposing circumferential face 139, so named as they face in a circumferential direction about rotor 110 (FIGS. 1 and 2). A platform seal pin 140 may be seated in an axially extending platform pin groove 142, and a pair of radial seal pins 144 may be positioned in corresponding radial seal pin grooves 146 in respective cover plates 130, 132, e.g., second circumferential face 139.

Figure 4:
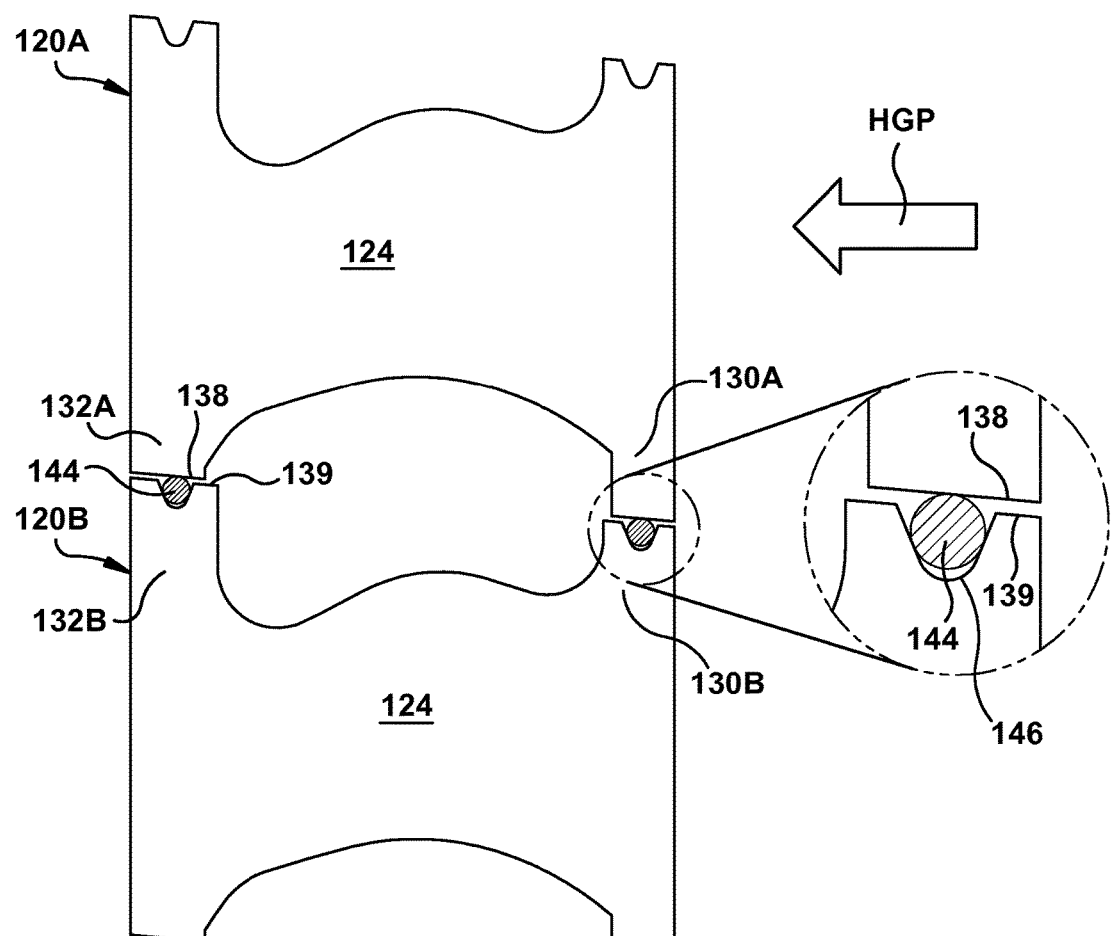
FIG. 4 shows a cross-sectional view of a conventional radial seal pin between two adjacent turbine blades.

FIG. 4 shows a cross-sectional view of a pair of adjacent turbomachine blades 120A, 120B having respective upstream side cover plates 130A, 130B and downstream side cover plates 132A, 132B. As described, seal pins 144 in grooves 146 in circumferential face 139 of cover plate(s) 130B, 132B of one turbomachine blade 120B seal against circumferential face 138 of cover plate 132A, 132B, respectively, of an adjacent turbomachine blade 120A.

Figure 5:
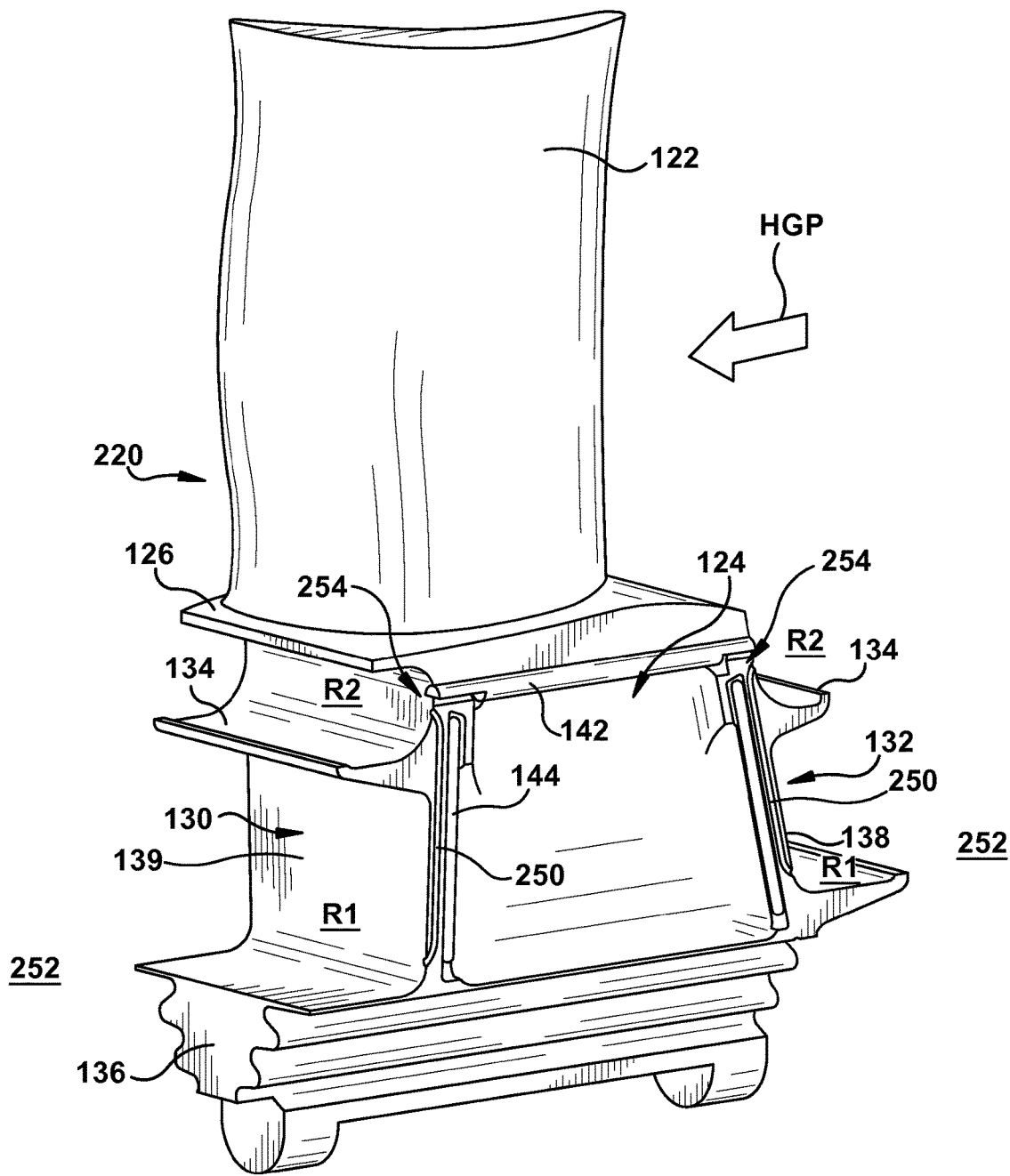
FIG. 5 shows an enlarged perspective view of an illustrative turbomachine blade employing a radial cooling groove according to embodiments of the disclosure.
Figure 6:
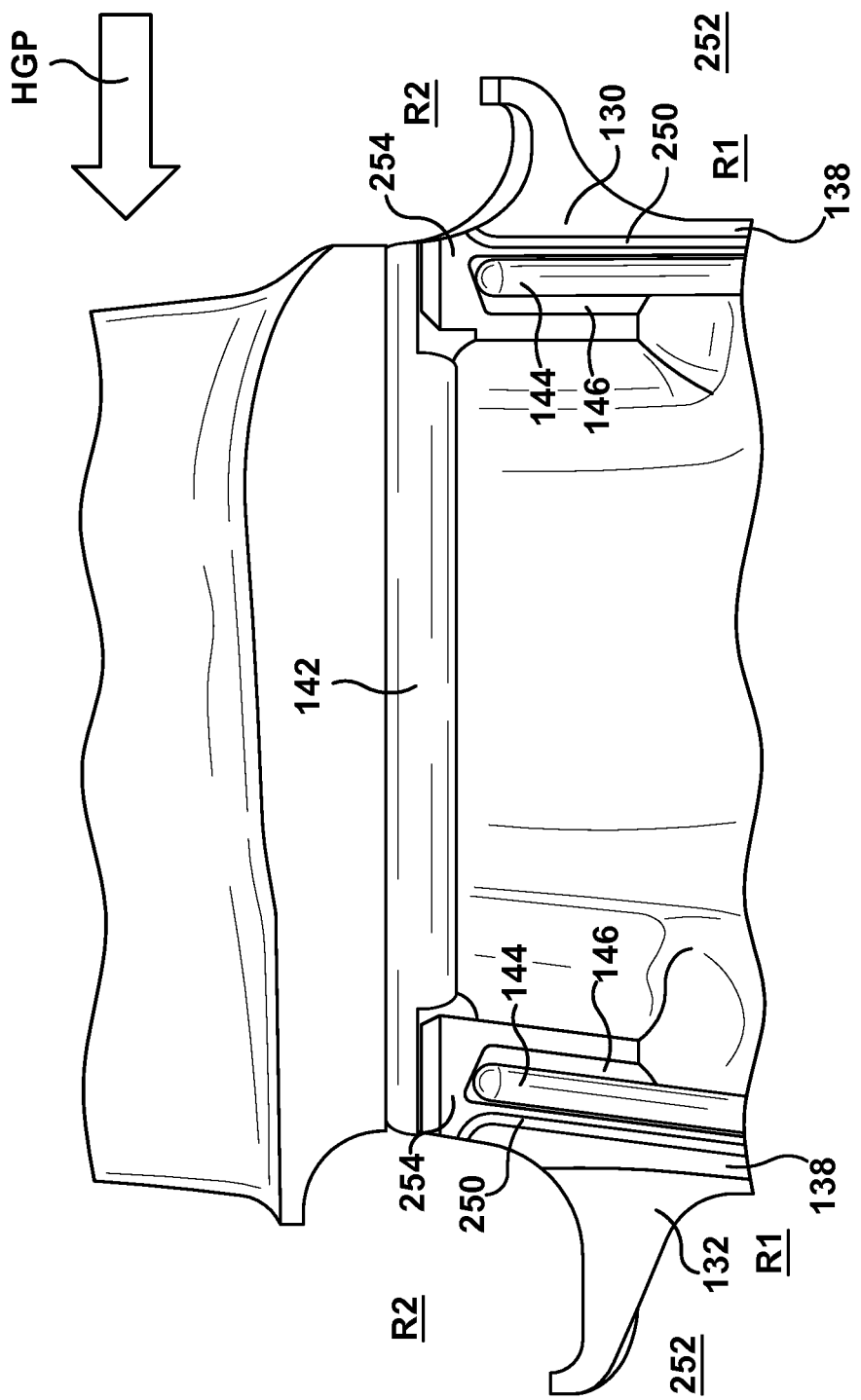
FIG. 6 shows a partial side view of a turbomachine blade employing a radial cooling groove according to embodiments of the disclosure.

Referring to FIGS. 5-6, in accordance with embodiments of the disclosure, a turbomachine blade 220 may include a radial cooling groove 250 positioned in first circumferential face 138 thereof. Radial cooling groove 250 is configured to allow a cooling fluid, e.g., purge flow from a wheelspace 252 or other source, to pass from a first radial position R1 to a second, different radial position R2 relative to a platform 126, thus increasing a cooling fluid flow through the gap between blades to provide additional cooling to the cover plate, shank and platform. In one embodiment, as shown in FIG. 5 and right side of FIG. 6, effective cooling and purging may be achieved with a radial cooling groove 250 terminating either at one end or both ends of a respective cover plate (130 as illustrated). In an alternative embodiment, shown only on the left side of FIG. 6, radial cooling groove 250 may extend from wheel space 252 at two different locations along the respective cover plate so as to deliver the cooling fluid from one higher pressure area (at R1) to another lower pressure area (at R2) of wheel space 252. In this case, radial cooling groove 250 may extend radially to have flow exit from a platform gap 254 between or adjacent a radial outermost end (upper end as shown) of radial seal pin 144 and a bottom end of platform seal pin 142. This arrangement assists in preventing ingestion of hot gasses from HGP. In any event, radial cooling groove 250 may extend around at least one angel wing 134 (FIG. 5) extending from a respective cover plate 130, 132. The length of radial cooling groove 250 may be user selected to deliver cooling fluid to any portion of cover plate desired.

As understood in the art, the purge flow may be pulled from a source of fluid; for example, for a gas turbine system, a purge flow may be created from a compressor feed and directed to wheelspace 252 to prevent ingestion of a working fluid from hot gas path (HGP). The cooling provided by purge flow in radial cooling groove 250 can occur even where radial seal pin seats 146 are employed, as will be described herein, because groove 250 may be provided adjacent to seal pin seats 146. In any event, no obstruction is provided in radial cooling grooves 250 so cooling fluid may flow freely. While each radial cooling groove(s) 250 is referred to as "radial", it is emphasized that it need not extend exclusively radially relative to a rotor 110 (FIGS. 1 and 2) axis, and may have some level of angling generally commensurate with cover plate 130, 132 in which it is positioned, e.g., +/−2-15° angle from perfectly radial. Further, while shown as a linear element, radial cooling groove 250 may have some non-linear portions, e.g., minor jigs or curvature.

FIGS. 7-11 show enlarged cross-sectional views of a pair of cover plates 130A, 130B (or 132A, 132B in FIG. 11 only) of adjacent turbomachine blades 220A, 220B showing various embodiments of radial cooling grooves and radial seal pins 144 that may be employed according to the disclosure.

In FIG. 7, radial seal pin seat 146 is positioned within cover plate 130B and configured to receive radial seal pin 144 therein to seal a circumferential gap between adjacent turbomachine blade cover plates 130A and 130B, respectively. In this embodiment, radial cooling groove 250 of one turbomachine blade 220A is positioned adjacent radial seal pin seat 146 of adjacent turbomachine blade 220B in an operative state, i.e., across the gap therebetween spanned by pin 144. In any of the embodiments described herein, a width W of one or more cover plates 130A, 130B, 132A, 132B may be slightly enlarged compared to conventional cover plates to accommodate radial cooling groove 250. In one embodiment, shown in FIG. 7, radial seal pin seat 146 is positioned in second circumferential face 139 and radial cooling groove 250 is positioned axially offset (along rotor axis A) from radial seal pin seat 146 in first circumferential face 138. As used herein, "axially offset" indicates corners where each radial cooling groove meets a respective circumferential face do not meet opposing corners of radial seal pin seat 146 along a substantially identical axial line (perpendicular to axis A). Where a radial cooling groove 250 and a radial seal pin seat 146 has an apex, such as a top portion of semi-circular openings (which is not necessary in all instances), "axially offset" may manifest in an apex of each groove being not axially aligned along a single axial line (perpendicular to axis A).

In one embodiment, as shown in FIG. 7, the axial offset may be such that radial cooling groove 250 in first circumferential face 138 axially overlaps radial seal pin seat 146 in first circumferential face 139. Alternatively, as shown in FIG. 8, radial cooling groove 250 in first circumferential face 138 may not axially overlap radial seal pin seat 146 in first circumferential face 139. That is, radial cooling groove 250 is opposed simply by second circumferential face 139, which is planar.

Figure 9:
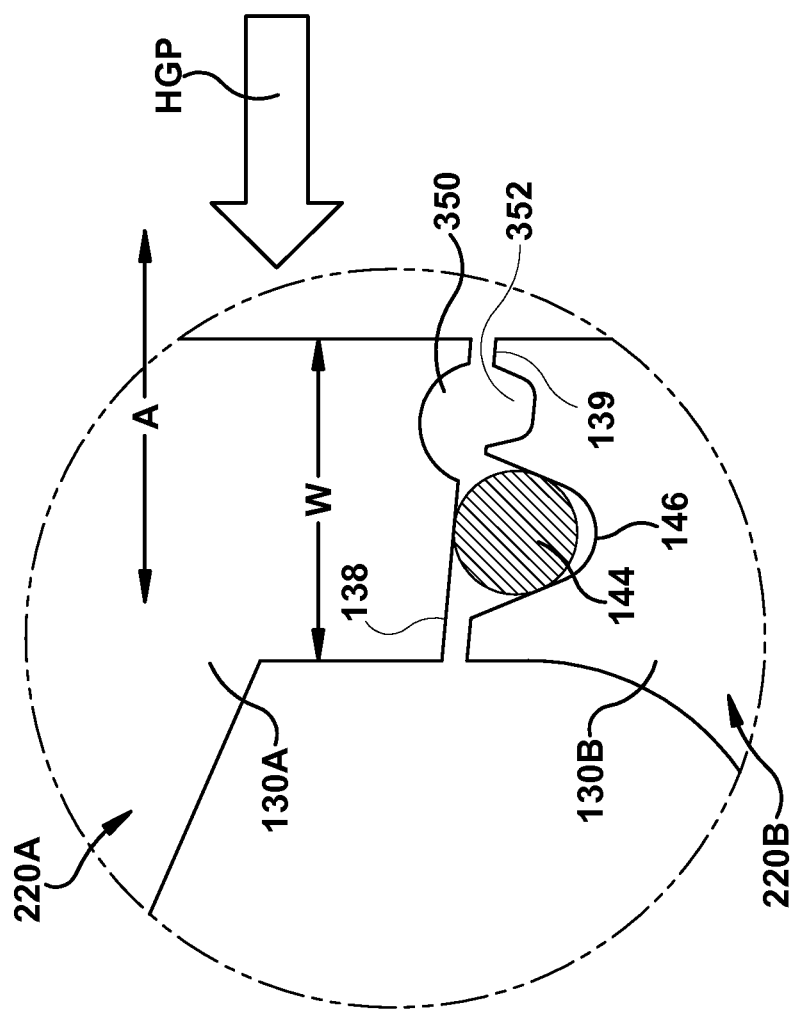

In another embodiment shown in FIG. 9, the radial cooling groove may include a first radial cooling groove 350 positioned axially offset from radial seal pin seat 146 in first circumferential face 138 and a second radial cooling groove 352 positioned axially offset from radial seal pin seat 146 in second circumferential face 139. Here, second radial cooling groove 352 is positioned adjacent radial seal pin seat 146 in circumferential face 139. A width of cover plate 130A, 130B may be increased to accommodate both seat 146 and groove 352.

FIG. 10 illustrates another embodiment in which cover plate 130A includes an axial face 460, generally facing axially along rotor axis A, and a radial cooling groove 450 extends radially (into and out of page) between axial face 460 and one (first) circumferential face (138 as illustrated). In this form, radial cooling groove 450 appears as a radial notch out of a corner between axial face 460 and an adjacent circumferential face. FIG. 11 shows another embodiment in which the FIG. 10 embodiment is repeated for each adjacent cover plate 130A and 130B. That is, the radial cooling groove further includes a second radial cooling groove 452 extending radially between axial face 462 and the other of the first and second circumferential faces (139 as illustrated) such that the first and second radial cooling grooves 450, 452 of adjacent turbomachine blades 220A, 220B are juxtaposed in an operative state. Collectively, grooves 450, 452 act to direct a cooling fluid for cooling cover plates 130A, 130B, 132A, 132B.

In FIGS. 6-10, each cover plate has been illustrated as an upstream side cover plate 130A or 130B. However, as shown for example in FIG. 11, the teachings of the disclosure may be applied to just downstream side cover plate 132A or 132B. Alternatively, as shown in FIGS. 5 and 6, both upstream side and downstream side cover plates may include a radial cooling groove in at least one of first circumferential face 138 and second, opposing circumferential face 139 thereof.

While each radial cooling groove described herein has been illustrated as rounded in cross-section, e.g., semi-circular, quarter-round, etc., it is emphasized that radial cooling grooves can take any cross-sectional shape such as but not limited to: polygonal such as rectangular, square, hexagonal, etc.; rounded polygonal; triangular; etc.

Figure 12:
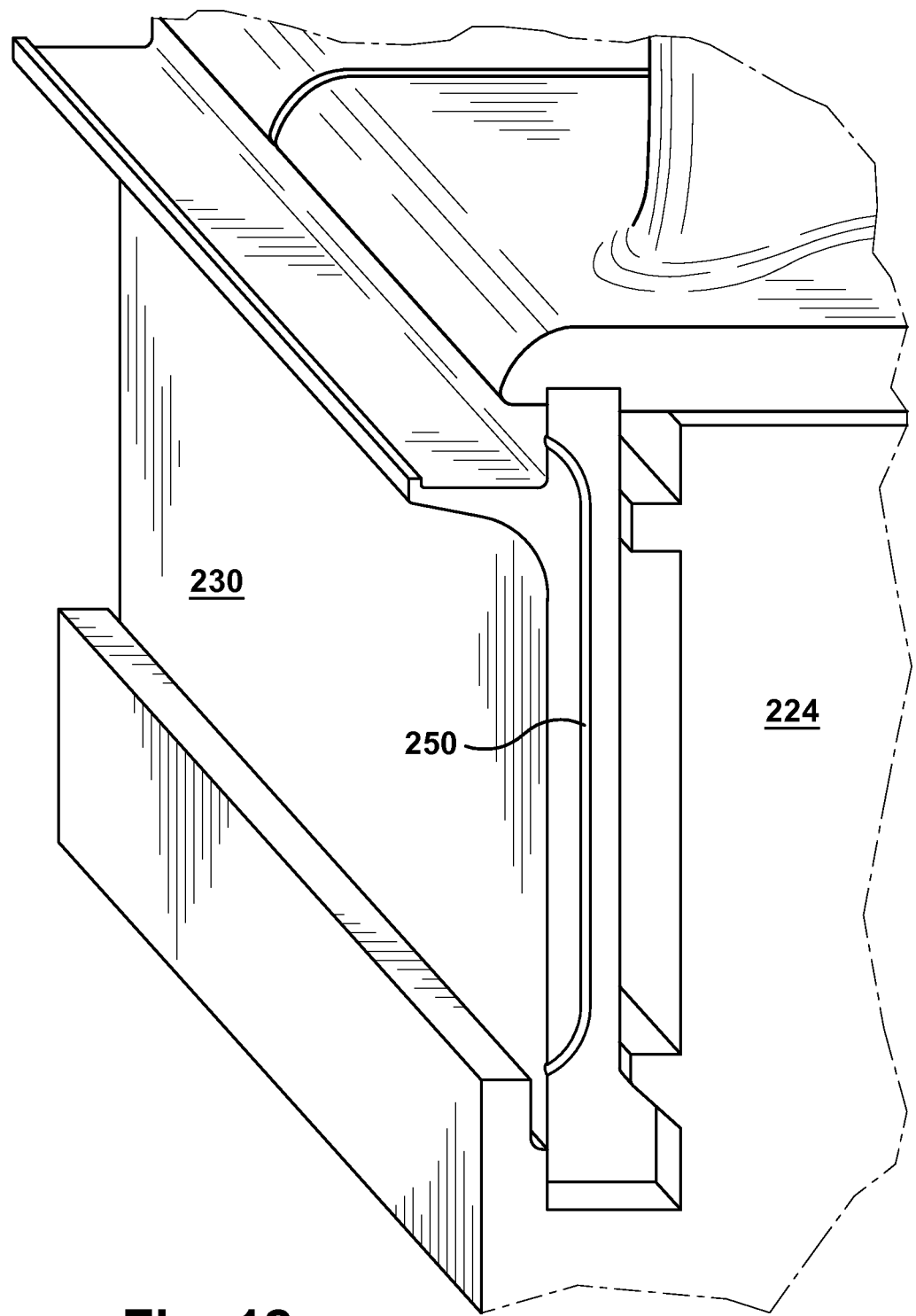
FIG. 12 shows a perspective view of an alternative cover plate arrangement in which a radial cooling groove according to embodiments of the disclosure is applied.

While the teachings of the disclosure have been described herein as being applied to a cover plate 130, 132 that is integral with a shank 124, as shown in FIG. 12, the teachings are equally applicable to a setting where a cover plate 230 is not integral with a shank 224. That is, cover plate 230 is a separate part and either mated with or otherwise coupled to shank 224. As will be appreciated, any of the embodiment of a radial cooling groove 250 described herein may be applied in this setting also.

Radial cooling groove(s), as described herein, direct a small portion of the wheelspace purge air for cooling of the turbomachine blade cover plate, shank and platform. The flow through the radial groove also effectively purges platform gap 254 (FIGS. 5-6) and prevents hot gas ingestion from the hot gas path (HGP) through platform gap 254 and around the end of platform seal pin 142. In this fashion, the radial cooling groove(s) takes advantage of the cooling air flowing radially between turbomachine blade cover plates and increases the flow area to ensure that sufficient air is directed for turbomachine blade cover plate, shank and platform cooling. Thus, radial cooling groove(s) provide additional cooling and sealing of the turbomachine blade shank and platform without the need to pressurize the shank cavity with little additional cost.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A turbomachine blade, comprising:
   an airfoil;
   a platform coupled to the airfoil;
   a shank coupled to the airfoil and extending from the platform, the shank including a cover plate having a first circumferential face and a second, opposing circumferential face; and
   a radial cooling groove positioned longitudinally in the first circumferential face and oriented in a substantially radial direction, the radial cooling groove configured to allow a cooling fluid to pass from a first radial position to a second, different radial position relative to the platform.

2. The turbomachine blade of claim 1, further comprising:
   a radial seal pin seat positioned within the cover plate and configured to receive a radial seal pin therein to seal a circumferential gap between adjacent turbomachine blade cover plates, wherein the radial cooling groove of one turbomachine blade is positioned adjacent the radial seal pin seat of an adjacent turbomachine blade in an operative state.

3. The turbomachine blade of claim 2, wherein the radial seal pin seat is positioned in the second circumferential face and the radial cooling groove is positioned axially offset from the radial seal pin seat in the first circumferential face.

4. The turbomachine blade of claim 3, wherein the axial offset is such that the radial cooling groove in the first circumferential face axially overlaps the radial seal pin seat in the second circumferential face.

5. The turbomachine blade of claim 2, wherein the radial cooling groove includes a first radial cooling groove positioned axially offset from the radial seal pin seat in the first circumferential face and a second radial cooling groove positioned axially offset from the radial seal pin seat in the second, opposing circumferential face.

6. The turbomachine blade of claim 1, wherein the cover plate includes an axial face and the radial cooling groove includes a first radial cooling groove extending radially between the axial face and one of the first and second circumferential faces.

7. The turbomachine blade of claim 6, wherein the radial cooling groove further includes a second radial cooling groove extending radially between the axial face and the other of the first and second circumferential faces such that the first and second radial cooling grooves of adjacent turbomachine blades are juxtaposed in an operative state.

8. The turbomachine blade of claim 1, wherein the cover plate includes an upstream side cover plate.

9. The turbomachine blade of claim 1, wherein the shank includes an upstream side cover plate and a downstream side cover plate, each cover plate including the radial cooling groove in at least one of the first circumferential face and the second, opposing circumferential face.

10. The turbomachine blade of claim 1, wherein the radial cooling groove extends around at least one angel wing extending from the cover plate.

11. A turbomachine blade, comprising:
an airfoil;
a platform coupled to the airfoil;
a shank extending from the platform, the shank including a cover plate having a first circumferential face and a second, opposing circumferential face;
a radial seal pin seat positioned within the first circumferential face of the cover plate and configured to receive a radial seal pin therein to seal a circumferential gap between adjacent turbomachine blade cover plates; and a radial cooling groove positioned within the second, opposing circumferential face of the cover plate, the radial cooling groove configured to allow a cooling fluid to pass therethrough,
wherein the radial seal pin seat is positioned in the first circumferential face and the radial cooling groove is positioned axially offset from the radial seal pin seat in the second, opposing circumferential face, and wherein the axial offset is such that the radial cooling groove in the first circumferential face axially overlaps the radial seal pin seat in the second circumferential face.

12. The turbomachine blade of claim 11, wherein the radial cooling groove includes a first radial cooling groove positioned axially offset from the radial seal pin seat in the first circumferential face and a second radial cooling groove positioned axially offset from the radial seal pin seat in the second circumferential face.

13. The turbomachine blade of claim 11, wherein the cover plate includes an axial face and the radial cooling groove includes a first radial cooling groove extending radially between the axial face and one of the first and second circumferential faces.

14. The turbomachine blade of claim 13, wherein the radial cooling groove further includes a second radial cooling groove extending radially between the axial face and the other of the first and second circumferential faces such that the first and second radial cooling grooves are juxtaposed in an operative state of adjacent turbomachine blades.

15. The turbomachine blade of claim 11, wherein the cover plate includes an upstream side cover plate.

16. A turbomachine blade, comprising:
an airfoil;
a platform coupled to the airfoil;
a shank extending from the platform, wherein the shank includes an upstream side cover plate and a downstream side cover plate, each cover plate including a respective first circumferential face and a second, opposing circumferential face;
a radial seal pin seat positioned within the first circumferential face of each cover plate and configured to receive a radial seal pin therein to seal a circumferential gap between adjacent turbomachine blade cover plates, and
a radial cooling groove positioned adjacent the radial seal pin seat in the each cover plate, the radial cooling groove configured to allow a cooling fluid to pass therethrough.

17. The turbomachine blade of claim 11, wherein the radial cooling groove extends around at least one angel wing extending from the cover plate.

* * * * *